(12) United States Patent
Honda et al.

(10) Patent No.: US 10,838,678 B2
(45) Date of Patent: Nov. 17, 2020

(54) DISPLAY CONTROL DEVICE, DISPLAY SYSTEM, DISPLAY CONTROL METHOD, AND PROGRAM

(71) Applicant: DENSO TEN Limited, Kobe (JP)

(72) Inventors: Fumi Honda, Kobe (JP); Shuji Yamada, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/996,836

(22) Filed: Jun. 4, 2018

(65) Prior Publication Data

US 2019/0034148 A1 Jan. 31, 2019

(30) Foreign Application Priority Data

Jul. 26, 2017 (JP) .................................. 2017-144849

(51) Int. Cl.
*G06F 3/14* (2006.01)
*G09G 5/14* (2006.01)

(52) U.S. Cl.
CPC ............. *G06F 3/1423* (2013.01); *G09G 5/14* (2013.01); *G09G 2320/0613* (2013.01); *G09G 2320/10* (2013.01); *G09G 2354/00* (2013.01); *G09G 2380/10* (2013.01)

(58) Field of Classification Search
CPC .... G06F 3/1423; G09G 5/14; G09G 2320/10; G09G 2320/0613; G09G 2354/00; G09G 2380/10
See application file for complete search history.

(56) References Cited

U.S. PATENT DOCUMENTS

| 2015/0193911 A1* | 7/2015 | Mochizuki | G09G 5/14 345/668 |
| 2018/0136902 A1* | 5/2018 | Feit | G06F 3/167 |
| 2018/0287962 A1* | 10/2018 | Jun | H04L 67/141 |

FOREIGN PATENT DOCUMENTS

| JP | 2015-018432 A | 1/2015 |
| JP | 2017-117390 A | 6/2017 |

* cited by examiner

*Primary Examiner* — Kent W Chang
*Assistant Examiner* — Andrew Lee
(74) *Attorney, Agent, or Firm* — Oliff PLC

(57) ABSTRACT

A display control device according to an embodiment includes an acceptance unit, a setting unit, and a change unit. The acceptance unit accepts a change instruction for a display type on each of a plurality of screens capable of displaying images with different display types. The setting unit limits and sets the display type in such a manner that images with an identical display type are not displayed on the plurality of screens when the display type is changed based on the change instruction. The change unit changes an image on a screen with the change instruction being applied thereto to an image with the set display type.

12 Claims, 9 Drawing Sheets

DISPLAY CONTROL DEVICE, DISPLAY SYSTEM, DISPLAY CONTROL METHOD, AND PROGRAM

CROSS-REFERENCE TO RELATED APPLICATION(S)

This application is based upon and claims the benefit of priority of the prior Japanese Patent Application No. 2017-144849, filed on Jul. 26, 2017, the entire contents of which are incorporated herein by reference.

FIELD

The embodiment(s) discussed herein is/are directed to a display control device, a display system, a display control method, and a program.

BACKGROUND

A display control device has conventionally been known that divides a display into a plurality of screens and displays, for example, a map, on each of divided screens (see, for example, Japanese Laid-open Patent Publication No. 2015-018432).

However, in the aforementioned display control device, for example, displaying images with different display types on a plurality of divided screens, respectively, and changing the display types that are displayed on the plurality of screens are not taken into consideration.

SUMMARY

A display control device according to an embodiment includes an acceptance unit, a setting unit, and a change unit. The acceptance unit accepts a change instruction for a display type on each of a plurality of screens capable of displaying images with different display types. The setting unit limits and sets the display type in such a manner that images with an identical display type are not displayed on the plurality of screens when the display type is changed based on the change instruction. The change unit changes an image on a screen with the change instruction being applied thereto to an image with the set display type.

DESCRIPTION OF EMBODIMENT(S)

Hereinafter, a display control device, a display system, a display control method, and a program as disclosed in the present application will be described with reference to the accompanying drawing(s). Additionally, this invention is not limited by the embodiment(s) as described below.

Figure 1:
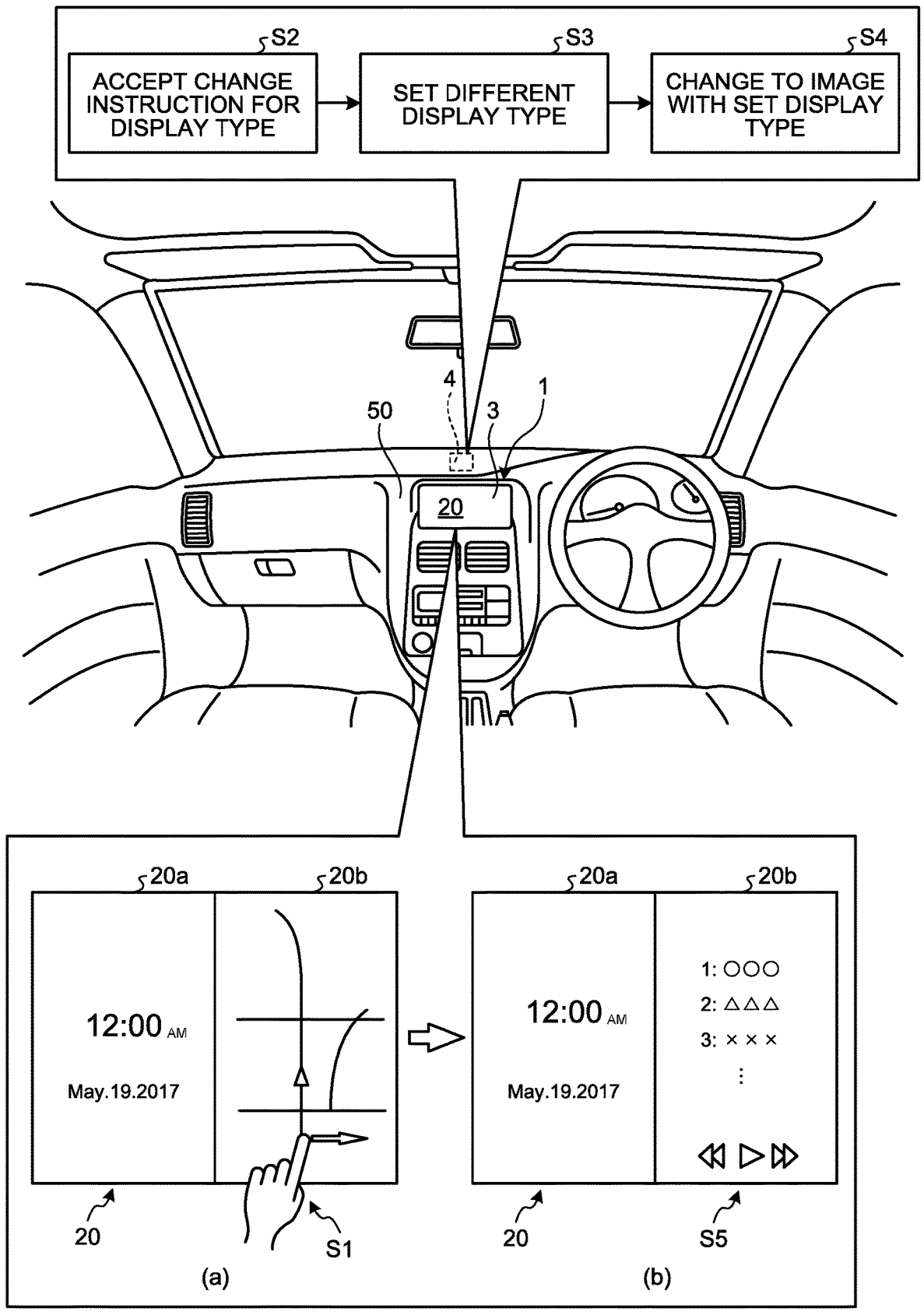
FIG. 1 is a diagram illustrating an outline of a display control method according to an embodiment.

First, an outline of a display control method according to an embodiment will be described with reference to FIG. 1 FIG. 1 is a diagram illustrating an outline of a display control method according to an embodiment.

A display control method according to an embodiment is executed by, for example, a navigation system 1 that is a display system that is mounted on a vehicle. The navigation system 1 includes a display unit 3 and a display control device 4.

Hereinafter, a left hand side and a right hand side when viewed from a driver's seat of a vehicle at a time of forward movement thereof are referred to as "left" and "right", respectively.

The display unit 3 is arranged on, for example, an instrument panel 50 in a vehicle interior thereof. The display unit 3 is a touch panel that is operable by a user that executes a touch operation thereon.

The display unit 3 includes a screen 20 such as a liquid crystal panel. The display unit 3 displays images with various display types on the screen 20. A display type is, for example, "navigation", "audio", "clock", "azimuth", "speed meter", or the like. Furthermore, it is possible for the display unit 3 to divide the screen 20 into a plurality of screens 20*a* and 20*b* and display images with different display types on the plurality of screens 20*a* and 20*b*. Herein, although an example of dividing into the two screens 20*a* and 20*b* will be described as an example, this is not limiting.

For example, the display unit 3 displays an image of "clock" on the screen 20*a* on a left side (that will be referred to as a "left screen" below) among the screens 20*a* and 20*b* that are divided into left and right, and displays an image of "navigation" on the screen 20*b* on a right side (that will be referred to as a "right screen" below) ((a) in FIG. 1). In such a situation, in a case where the right screen 20*b* is slide-operated (S1), the display control device 4 accepts such a slide operation as a change instruction for a display type of an image for the right screen 20*b* (S2). Additionally, a slide operation includes a flick operation and a swipe operation.

As a change instruction for a display type is accepted, the display control device 4 sets a display type of an image that is displayed on the right screen 20*b* at a display type that is different from a display type of an image that is displayed on the left screen 20*a* (S3). That is, the display control device 4 limits and sets a display type in such a manner that images with an identical display type are not displayed on the plurality of screens 20*a* and 20*b*. For example, the display control device 4 sets a display type of an image that is displayed on the right screen 20*b* at "audio" that is different from "clock".

The display control device 4 changes an image that is displayed on the right screen 20*b* to an image with such a set display type (S4). Thereby, an image of "audio" is displayed on the right screen 20*b* of the display unit 3 ((b) in FIG. 1) (S5).

Thus, the display control device 4 prevents images with an identical display type from being displayed on the plurality of screens 20*a* and 20*b* of the display unit 3, so that it is possible to improve convenience of a user when changing display types of images that are displayed on the plurality of screens 20a and 20b.

Figure 2:
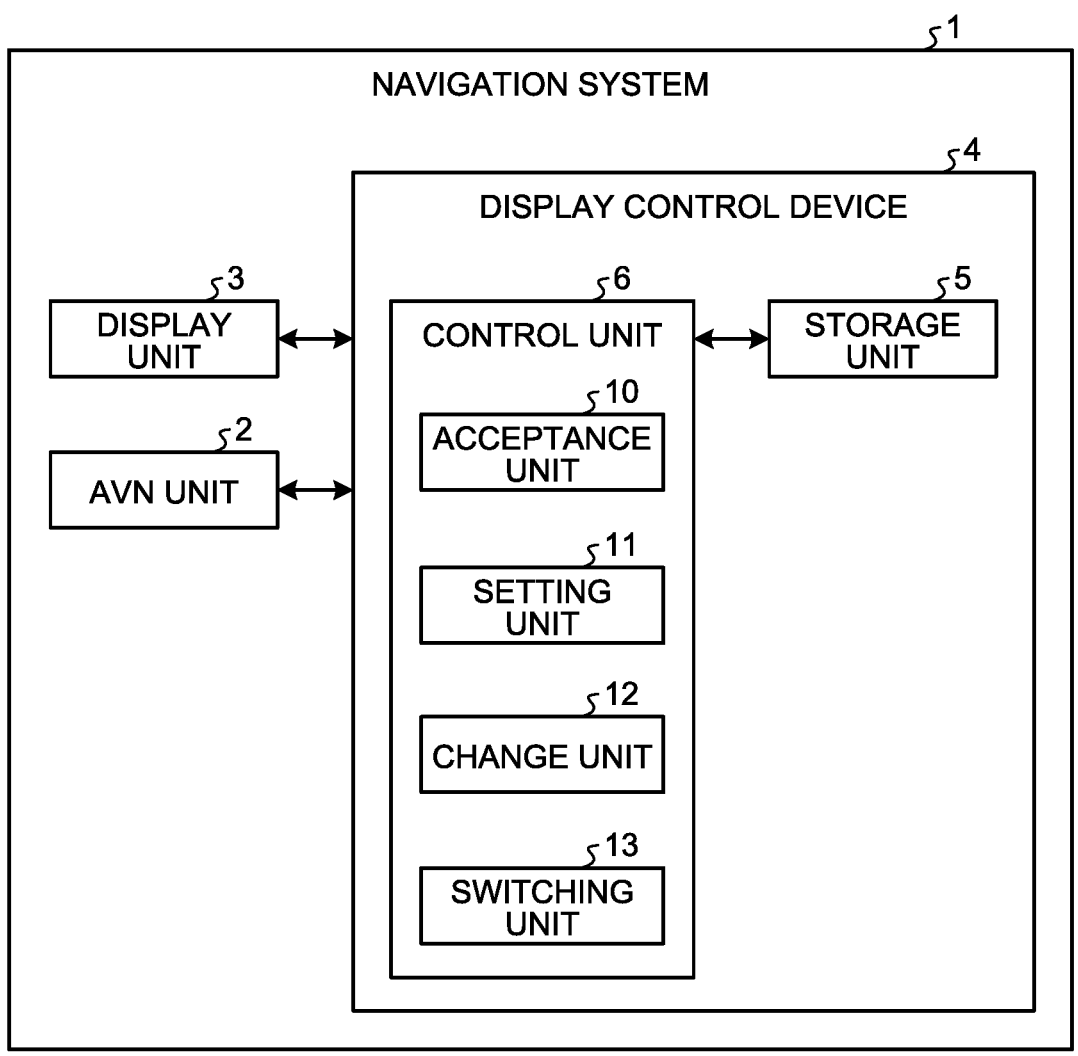
FIG. 2 is a block diagram illustrating a configuration of a navigation system according to an embodiment.

Next, a navigation system 1 according to an embodiment will be described with reference to FIG. 2. FIG. 2 is a block diagram illustrating a configuration of a navigation system 1 according to an embodiment.

The navigation system 1 includes an Audio Visual Navigation (AVN) (registered trademark) unit 2, a display unit 3, and a display control device 4.

The AVN unit 2 controls a variety of functions such as a navigation function and an audio function. For example, in a case where a navigation function is controlled, the AVN unit 2 executes setting of and guidance on a route to a destination that is specified by an operation of a user. Furthermore, for example, in a case where an audio function is controlled, the AVN unit 2 plays, in a vehicle interior, a music that is specified by an operation of a user or adjusts a volume or the like depending on an operation of a user.

Figure 4:
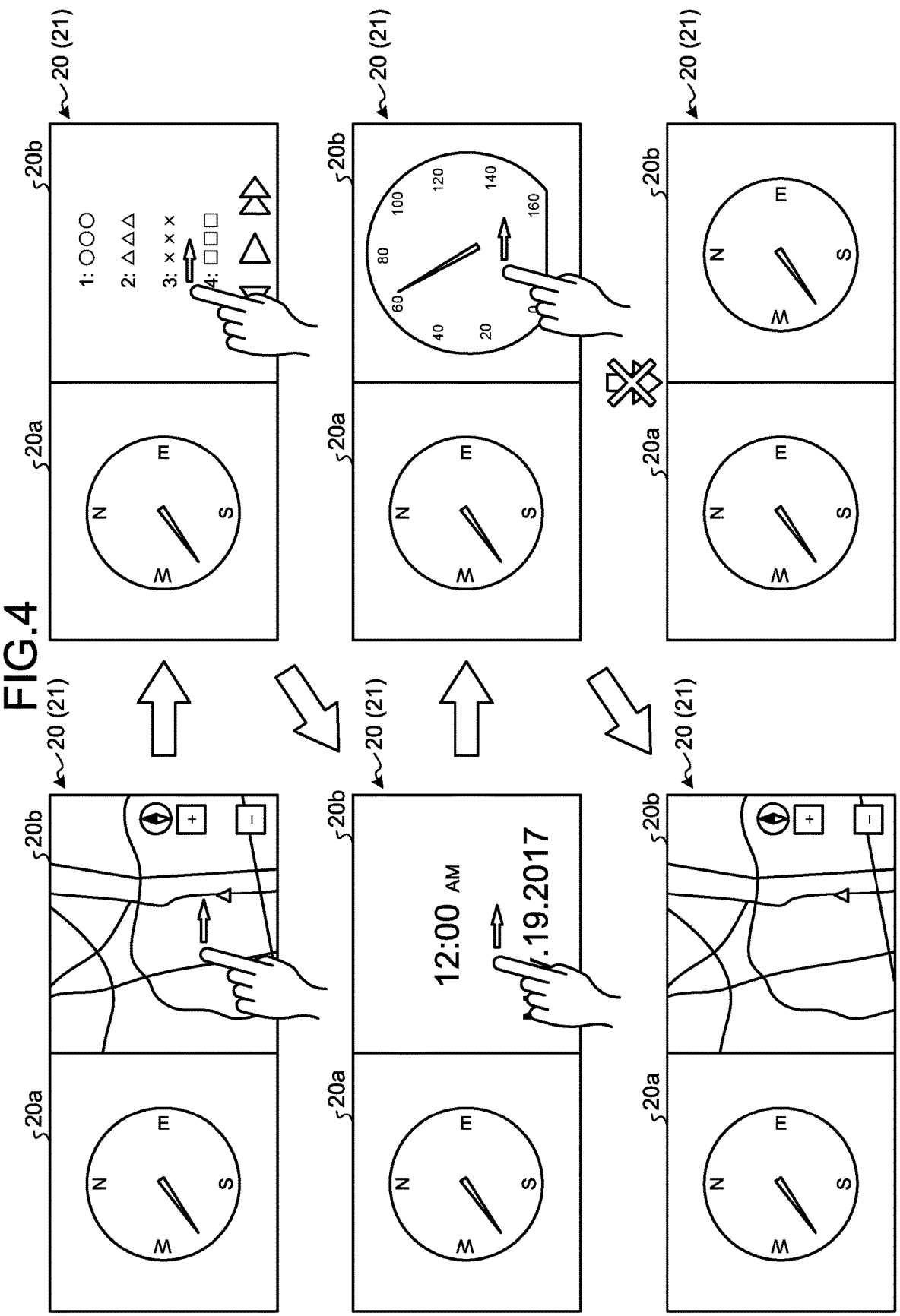
FIG. 4 is a diagram illustrating an example where a display type of an image on a right screen is changed depending on a slide operation.
Figure 5:
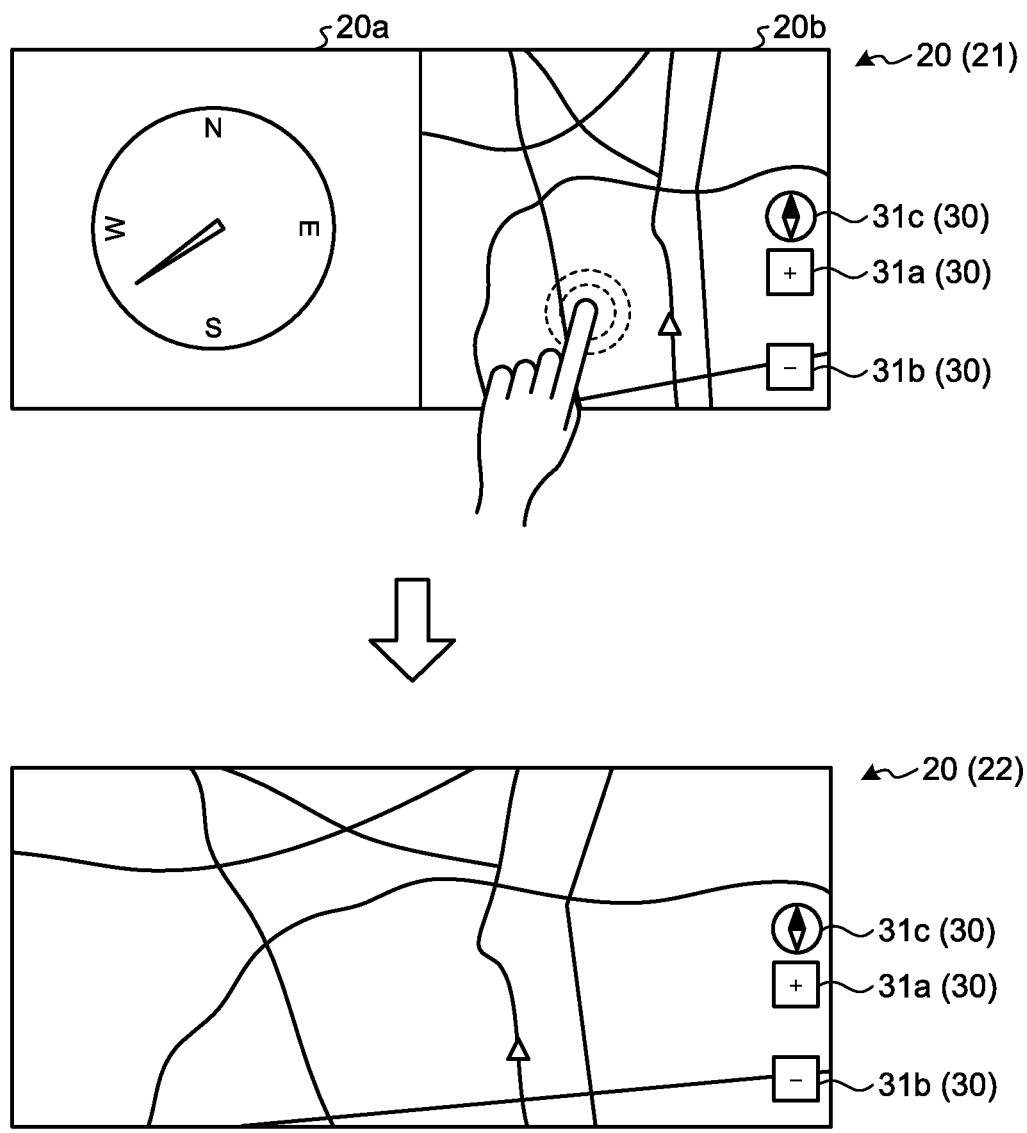
FIG. 5 is a diagram illustrating a case where a screen is switched from a divisional screen to an integrative screen depending on a touch operation.
Figure 6:
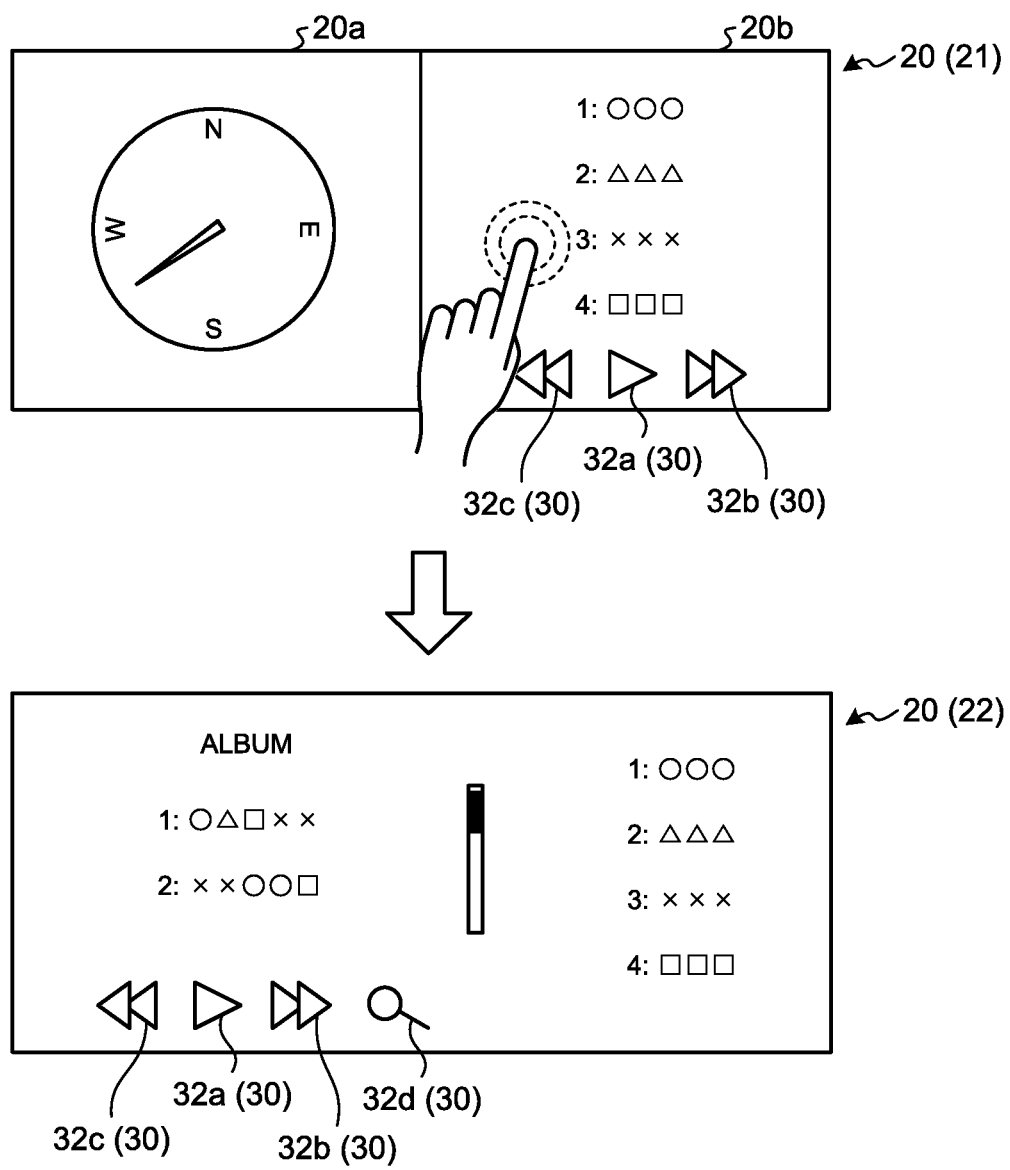
FIG. 6 is a diagram illustrating a case where a screen is switched from a divisional screen to an integrative screen depending on a touch operation.

It is possible for the display unit 3 to divide a screen 20 into a left screen 20a and a right screen 20b (see FIG. 4) depending on an operation of a user, and switch between, and display, a divisional screen 21 for displaying images with different display types (see FIG. 4) and an integrative screen 22 for displaying images with an identical display type on the screen 20 (see FIG. 5 and FIG. 6).

The display control device 4 includes a storage unit 5 and a control unit 6.

The storage unit 5 is, for example, a Random Access Memory (RAM) or a Hard Disk Drive (HDD). The storage unit 5 stores information of a variety of programs.

The control unit 6 includes, for example, a microcomputer that has a Central Processing Unit (CPU), a Read Only Memory (ROM), a RAM, an input/output port, and the like, and a variety of circuits. Additionally, a part or all of the control unit 6 may be composed of hardware such as an Application Specific Integrated Circuit (ASIC) or a Field Programmable Gate Array (FPGA).

The control unit 6 includes a plurality of processing units that function by executing a program (illustration omitted) that is recorded in the ROM while using the RAM as a working area. Specifically, the control unit 6 includes an acceptance unit 10, a setting unit 11, a change unit 12, and a switching unit 13. The control unit 6 may be composed of a plurality of control units and each processing unit may be composed of a plurality of processing units or may be composed integrally.

The acceptance unit 10 accepts an operation of a user, for example, a touch operation or a slide operation, through the display unit 3. In a case where an operation button 30 that is displayed on the screen 20 (see FIG. 5 and FIG. 6) is touch-operated, the acceptance unit 10 accepts such a touch operation as an operation instruction for each operation button 30.

In a case where an area other than the operation button 30 that is displayed on the screen 20 is touch-operated, the acceptance unit 10 accepts a touch operation as an operation instruction to switch between the divisional screen 21 and the integrative screen 22.

In a case where the display unit 3 executes display on the divisional screen 21, the acceptance unit 10 accepts an operation of a user for each of the screens 20a and 20b of the divisional screen 21. Specifically, the acceptance unit 10 accepts each of operations of a user for the right screen 20b and the left screen 20a. The acceptance unit 10 accepts, for the integrative screen 22, operation instructions with kinds more than those of operation instructions for the divisional screen 21. Additionally, an example of such an operation instruction will be described later.

In a case where the display unit 3 executes display on the divisional screen 21, the acceptance unit 10 accepts a slide operation as a change instruction to change a display type of an image for the screen 20a or 20b with the slide operation being executed thereon.

In a case where the display unit 3 executes display on the integrative screen 22, the acceptance unit 10 accepts a slide operation as an operation instruction that is set on each integrative screen 22.

Additionally, an operation of a user that is accepted by the acceptance unit 10 as described above is an example and this is not limiting. For example, an operation of a user may include a double tap where a touch operation is twice executed for a short period of time.

In a case where the display unit 3 executes display on the divisional screen 21 and a change instruction for a display type that is provided by a slide operation is accepted, the setting unit 11 sets a display type of an image that is displayed on, the screen 20a or 20b with the slide operation being executed thereon, that is, a screen with the change instruction being accepted thereon, based on the change instruction.

Herein, first, a basic method of setting of a display type that is executed by the setting unit 11 will be described, and subsequently, a method of setting with a display type being limited will be described.

Figure 3:
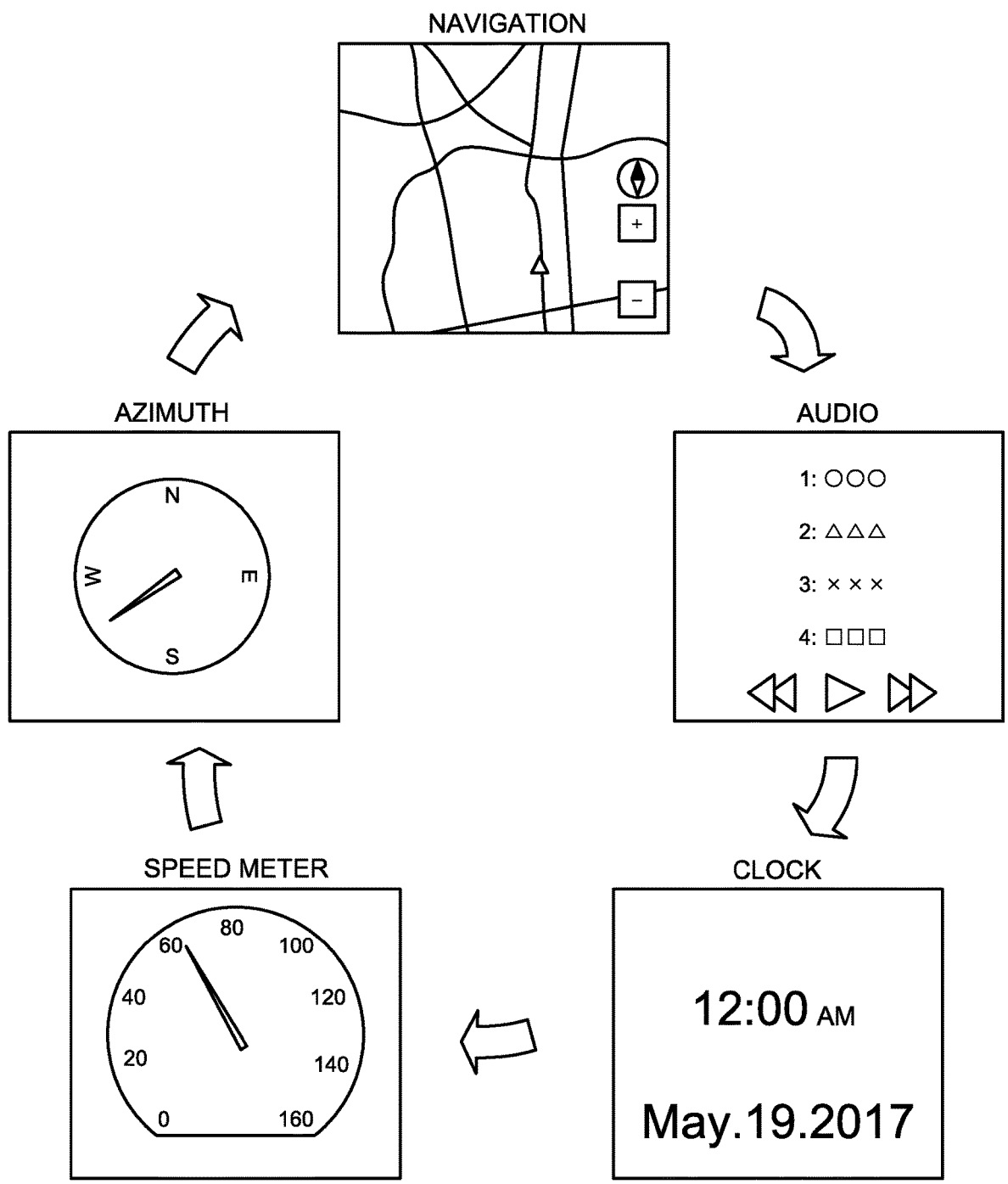
FIG. 3 is a diagram illustrating a list together with images.

In a case where a change instruction is accepted, the setting unit 11 sets a display type of an image based on a preliminarily defined order. Such an order is defined by, for example, a list, a table, or the like. Although an example of an order will be described by using a list below, this is not limiting. A list is determined in such a manner that a display type is set, for example, in order of "navigation", "audio", "clock", "speed meter", and "azimuth" as illustrated in FIG. 3, depending on a slide operation. FIG. 3 is a diagram illustrating a list together with images. Additionally, a display type after "azimuth" is set so as to return to "navigation". That is, the setting unit 11 sets a display type in such a manner that a display type is circularly displayed based on a slide operation of a user.

The setting unit 11 sets a display type depending on a change instruction for a display type for each of the screens 20a and 20b. For example, in a case where an image of "navigation" is displayed on the right screen 20b and a change instruction for a display type for the right screen 20b is accepted, the setting unit 11 sets a display type of an image that is displayed on the right screen 20b, at "audio". Furthermore, in a case where an image of "audio" is displayed on the right screen 20b and a change instruction for a display type for the right screen 20b is accepted, the setting unit 11 sets a display type of an image that is displayed on the right screen 20b, at "clock".

Additionally, the setting unit 11 may set an order of a change of a display type, depending on a direction of a slide operation. For example, in a case where a slide operation is executed from left to right, the setting unit 11 sets a display type in an order as illustrated in FIG. 3. Furthermore, in a case where a slide operation is executed from right to left, the setting unit 11 sets a display type in an order opposite to an order as illustrated in FIG. 3.

However, in a case where a display type is set as described above, images with an identical display type may be displayed on the respective screens 20a and 20b. In a case where images with an identical display type are displayed on the screens 20a and 20b that are the divisional screen 21, a user may feel irritation. Hence, the setting unit 11 limits displaying of images with an identical display type on the respective screens 20a and 20b and sets a display type.

In a case where a change instruction for a display type for one of the screens 20a and 20b in the divisional screen 21 is accepted, the setting unit 11 sets a display type that is different from a display type of an image that is displayed on the other of screens 20a and 20b at a display type of an image that is displayed on the one of screens 20a and 20b.

Specifically, the setting unit 11 skips a display type of an image that is displayed on the other of the screens 20a and 20b, and sets a display type, based on a list.

For example, in a case where an image of "azimuth" is displayed on the left screen 20a, an image of "speed meter" is displayed on the right screen 20b, and a slide operation is executed for the right screen 20b, the setting unit 11 sets a display type of the right screen 20b at "navigation" while skipping "azimuth", based on a list as illustrated by using FIG. 3.

The change unit 12 outputs a signal to the display unit 3 based on a result of setting of a display type that is executed by the setting unit 11, and changes an image on the screen 20a or 20b with a slide operation being executed on the divisional screen 21, that is, the screen 20a or 20b with a change instruction for a display type being accepted thereon, to an image with a set display type.

For example, in a case where, as illustrated in FIG. 4, an image of "azimuth" is displayed on the left screen 20a, an image of "navigation" is displayed on the right screen 20b, and the right screen 20b is slide-operated, the change unit 12 changes the right screen 20b depending on such a slide operation. FIG. 4 is a diagram illustrating an example where a display type of an image on the right screen 20b is changed depending on a slide operation. Additionally, it is herein assumed that a display type is changed in an order of a list as illustrated by using FIG. 3.

As the right screen 20b is slide-operated in a state where an image of "navigation" is displayed on the right screen 20b, the change unit 12 changes an image on the right screen 20b to an image of "audio". Then, as the right screen 20b is slide-operated, the change unit 12 changes an image on the right screen 20b to an image of "clock". Then, as the right screen 20b is slide-operated, the change unit 12 changes an image on the right screen 20b to an image of "speed meter".

Moreover, as the right screen 20b is slide-operated, an image of "azimuth" is skipped because the image of "azimuth" is displayed on the left screen 20a, and the change unit 12 changes an image on the right screen 20b to an image of "navigation".

Thus, the change unit 12 changes an image that is displayed on the screen 20a or 20b with a slide operation being executed thereon, while limiting displaying of images with an identical display type on the respective screens 20a and 20b.

By returning to FIG. 2, in a case where a touch operation on an area other than the operation button 30 that is displayed on the screen 20 is accepted as an operation instruction by the acceptance unit 10, the switching unit 13 switches between the divisional screen 21 and the integrative screen 22.

Specifically, in a case where a touch operation on an area other than the operation button 30 that is displayed on the divisional screen 21 is accepted as an operation instruction, the switching unit 13 switches the screen 20 from the divisional screen 21 to the integrative screen 22. Furthermore, in a case where a touch operation on an area other than the operation button 30 that is displayed on the integrative screen 22 is accepted as an operation instruction, the switching unit 13 switches the screen 20 from the integrative screen 22 to the divisional screen 21.

For example, in a case where, as illustrated in FIG. 5, an image of "azimuth" is displayed on the left screen 20a, an image of "navigation" is displayed on the right screen 20b, and an area other than the operation button 30 on the right screen 20b is touch-operated, the switching unit 13 switches the screen 20 from the divisional screen 21 to the integrative screen 22 and displays an image of "navigation" on an entire screen. FIG. 5 is a diagram illustrating a case where the screen 20 is switched from the divisional screen 21 to the integrative screen 22 depending on a touch operation.

The operation button 30 that is displayed in an image of "navigation" is, for example, a zoom-in button 31a, a zoom-out button 31b, and a display switching button 31c. The zoom-in button 31a is a button to zoom in a map near a vehicle mark. The zoom-out button 31b is a button to zoom out a map near a vehicle mark. The display switching button 31c is a button to switch an image of "navigation" to a head-up display or a north-up display. A head-up display is a display where a direction of travel of a vehicle mark constantly faces upward on the screen 20. A north-up display is a display where a northward direction constantly faces upward on the screen 20.

Additionally, in a case where an area other than the operation button 30 on the integrative screen 22 as illustrated in FIG. 5 is touch-operated, the switching unit 13 execute a change to the original divisional screen 21 where an image of "azimuth" is displayed on the left screen 20a and an image of "navigation" is displayed on the right screen 20b.

Furthermore, for example, in a case where, as illustrated in FIG. 6, an image of "azimuth" is displayed on the left screen 20a, an image of "audio" is displayed on the right screen 20b, and an area other than the operation button 30 on the right screen 20b is touch-operated, the switching unit 13 switches the screen 20 from the divisional screen 21 to the integrative screen 22 and displays an image of "audio" on an entire screen. FIG. 6 is a diagram illustrating a case where switching from the divisional screen 21 to the integrative screen 22 is executed depending on such a touch operation.

The operation button 30 that is displayed in an image of "audio" on the divisional screen 21 is, for example, a play button 32a, a fast-forward button 32b, and a rewind button 32c. The play button 32a is a button to play music, or a pause button to pause playing in a case where music is being played. The fast-forward button 32b and the rewind button 32c are buttons to change music. For example, as the fast-forward button 32b is operated in a case where a last music of an album is being played, a first music of a next album is played.

The operation button 30 that is displayed in an image of "audio" on the integrative screen 22 is, for example, a search button 32d in addition to the operation button 30 (the play button 32a, the fast-forward button 32b, and the rewind button 32c) on the divisional screen 21. The search button 32d is a button to search a music title or an album name.

Furthermore, as described above, the acceptance unit 10 accepts, for the integrative screen 22, operation instructions with kinds more than those of operation instructions for the divisional screen 21. That is, an operation that is operable by a user is limited more on the divisional screen 21 than on the integrative screen 22.

For example, in an image of "navigation" on the divisional screen 21 as illustrated in FIG. 5, the acceptance unit 10 accepts an operation for the operation button 30 as an operation instruction. On the other hand, in an image of "navigation" on the integrative screen 22 as illustrated in FIG. 5, the acceptance unit 10 accepts an operation such as movement of a map (a slide operation) as an operation instruction in addition to an operation instruction for the operation button 30.

Furthermore, for example, in an image of "audio" on the divisional screen 21 as illustrated in FIG. 6, the acceptance unit 10 accepts an operation of the play button 32a, the fast-forward button 32b, or the rewind button 32c as an operation instruction. On the other hand, in an image of "audio" on the integrative screen 22 as illustrated in FIG. 6, the acceptance unit 10 accepts an operation such as an operation of the search button 32d or selection of an album (a slide operation and a touch operation) in addition to an operation of the play button 32a, the fast-forward button 32b, or the rewind button 32c, as an operation instruction.

Furthermore, for example, in an image of "clock", the acceptance unit 10 does not accept an operation to change a month that is displayed, as an operation instruction on the divisional screen 21, but accepts an operation to change a month that is displayed, as an operation instruction on the integrative screen 22.

Figure 7:
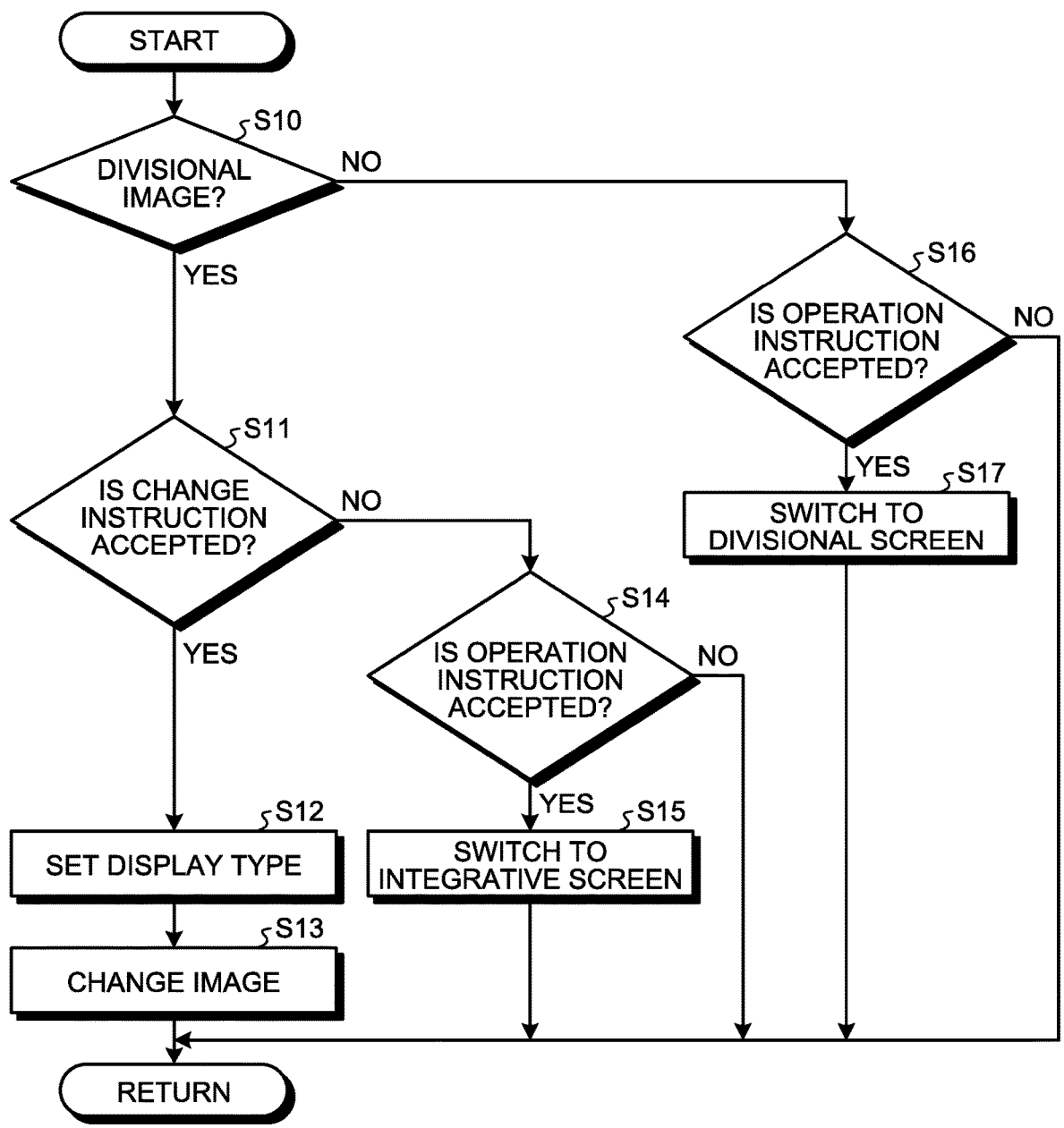
FIG. 7 is a flowchart illustrating a display control process according to an embodiment.

Next, a display control process according to an embodiment will be described with reference to FIG. 7. FIG. 7 is a flowchart illustrating a display control process according to an embodiment.

In a case where the display unit 3 provides the divisional screen 21 (S10: Yes) and a change instruction for a display type for one of the screens 20a and 20b in the divisional screen 21 is accepted (S11: Yes), the display control device 4 sets a display type of an image that is displayed on the screen 20a or 20b with the change instruction for a display type being accepted thereon (S12). Additionally, the display control device 4 sets a display type in such a manner that images with an identical display type are not displayed on the respective screens 20a and 20b.

The display control device 4 displays an image with a set display type on the screen 20a or 20b with a change instruction for a display type being accepted thereon and changes an image on the screen 20 or 20b with a change instruction for a display type being accepted thereon (S13).

In a case where a change instruction for a display type is not accepted for each of the screens 20a and 20b (S11: No) and a touch operation on an area other than the operation button 30 is accepted as an operation instruction (S14: Yes), the display control device 4 switches the screen 20 of the display unit 3 from the divisional screen 21 to the integrative screen 22 (S15).

In a case where a touch operation on an area other than the operation button 30 is not accepted as an operation instruction (S14: No), the display control device 4 ends a current process.

In a case where the display unit 3 does not provide the divisional screen 21 but provides the integrative screen 22 (S10: No) and a touch operation on an area other than the operation button 30 is accepted as an operation instruction (S16: Yes), the display control device 4 switches the screen 20 of the display unit 3 from the integrative screen 22 to the divisional screen 21 (S17).

In a case where a touch operation on an area other than the operation button 30 is not accepted as an operation instruction (S16: No), the display control device 4 ends a current process.

Next, an effect of an embodiment will be described.

As the navigation system 1 according to an embodiment accepts a change instruction for a display type of an image for the right screen 20b or the left screen 20a that is the divisional screen 21, a display type is limited in such a manner that images with an identical display type are not displayed on the left screen 20a and the right screen 20b, and an image on the screen 20a or 20b with the change instruction being accepted thereon is changed. Thereby, images with an identical display type is prevented from being displayed on the respective screens 20a and 20b, so that it is possible to improve convenience of a user when a display type of an image that is displayed on the divisional screen 21 is changed.

The navigation system 1 according to an embodiment is capable of switching the screen 20 of the display unit 3 between the divisional screen 21 for displaying images with different display types and the integrative screen 22 for displaying images with an identical display type, and accepts, for the integrative screen 22, operation instructions with kinds more than those of operation instructions for the divisional screen 21. Thereby, it is possible for a user to have visual contact with images with a plurality of display types due to the divisional screen 21, and further, it is possible to execute a detailed operation on, for example, a navigation function or an audio function, due to the integrative screen 22.

Next, a variation of the aforementioned embodiment(s) will be described.

A navigation system 1 according to a variation sets a display type based on a list that is set for each of the screens 20a and 20b in a case where the display unit 3 executes display on the divisional screen 21. Specifically, the navigation system 1 according to a variation sets a display type that is displayed on the right screen 20b based on a list that is set for the right screen 20b in a case where a change instruction for the right screen 20b is accepted. Furthermore, the navigation system 1 according to a variation sets a display type that is displayed on the left screen 20a based on a list that is set for the left screen 20a in a case where a change instruction for the left screen 20a is accepted. It is possible to set, list by list, a display type that is included in each list.

Thereby, in a case where the display unit 3 executes display on the divisional screen 21, it is possible to set display types of images that are displayed on the respective screens 20a and 20b, respectively, and it is possible to improve convenience of a user when display types of images that are displayed on the respective screens 20a and 20b are changed.

Furthermore, each list may be set in such a manner that a predetermined display type appears more frequently than other display types. Such a predetermined display type is a preliminarily set display type that may be settable by a user.

Figure 8:
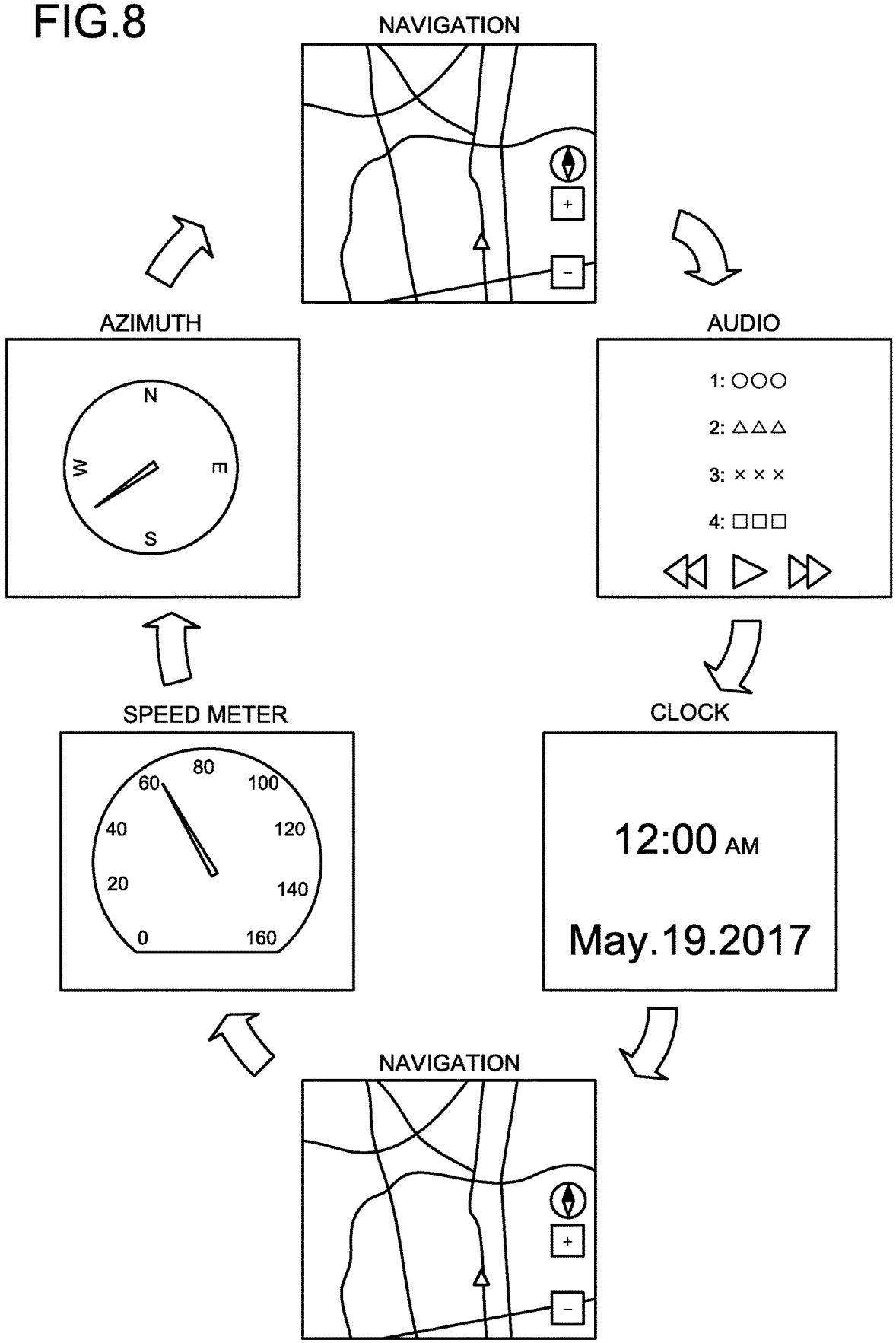
FIG. 8 is a diagram illustrating a list that is set so as to correspond to a right screen, together with images.

For example, a list that is set so as to correspond to the right screen 20b is set in such a manner that "navigation" as a predetermined display type appears more frequently than other display types, as illustrated in FIG. 8. FIG. 8 is a diagram illustrating a list that is set so as to correspond to the right screen 20b together with images. In a list that is set so as to correspond to the right screen 20b, an appearance ratio of "navigation" is 2/6 and each of appearance ratios of other display types ("audio", "clock", "speed meter", and "azimuth") is 1/6.

Figure 9:
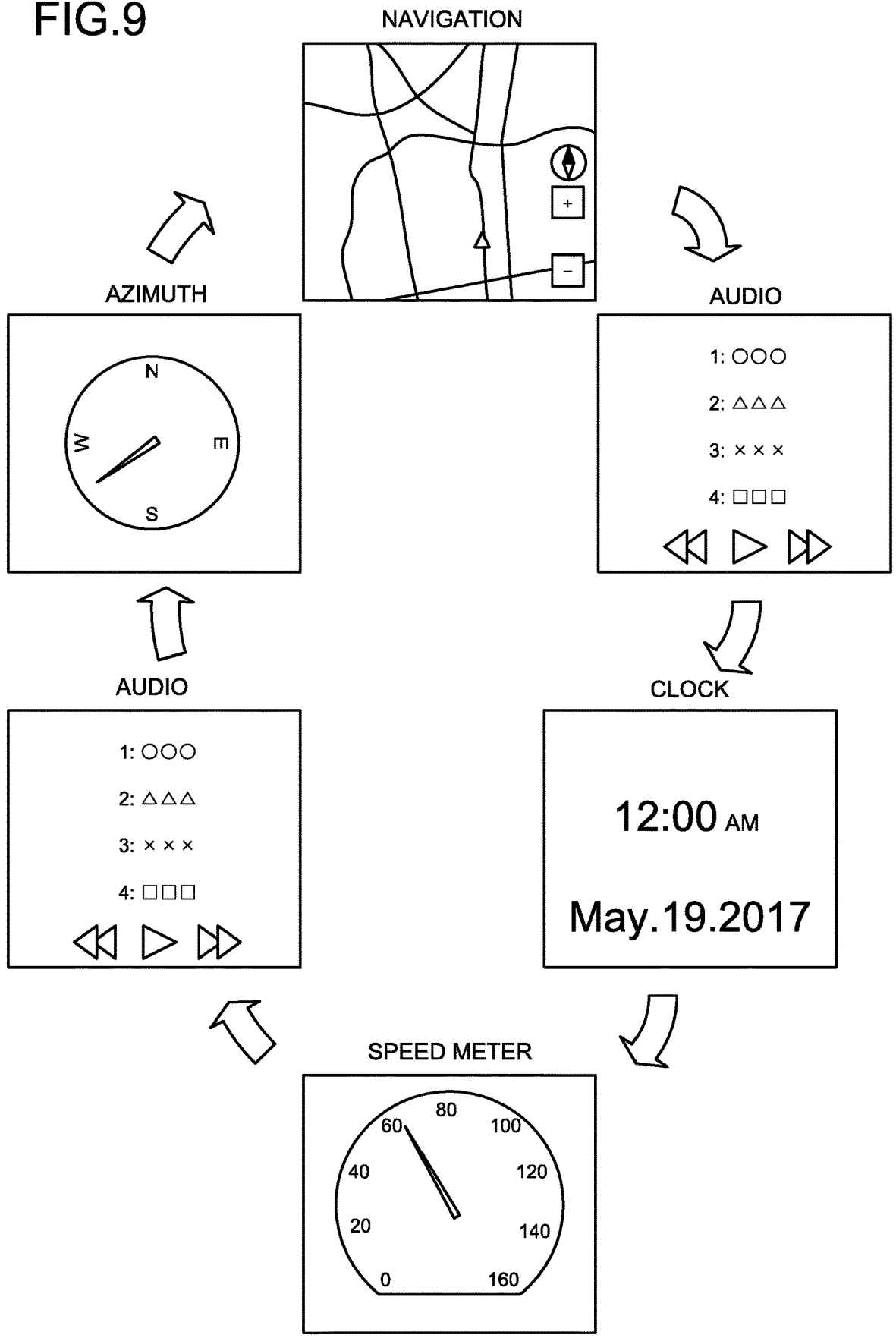
FIG. 9 is a diagram illustrating a list that is set so as to correspond to a left screen, together with images.

Furthermore, a list that is set so as to correspond to the left screen 20a is set in such a manner that "audio" as a predetermined display type appears more frequently than other display types, as illustrated in FIG. 9. FIG. 9 is a diagram illustrating a list that is set so as to correspond to the left screen 20a together with images. In a list that is set so as to correspond to the left screen 20a, an appearance ratio of "audio" is 2/6 and each of appearance ratios of other display types ("navigation", "clock", "speed meter", and "azimuth") is 1/6.

Additionally, a predetermined display type may be a plurality of display types. Furthermore, appearance ratios of a plurality of predetermined display types may further be set separately. For example, in a list with predetermined display types being "navigation" and "audio", an appearance ratio of "navigation", an appearance ratio of "audio", and appearance ratios of other display types ("clock", "speed meter", and "azimuth") are 3/8, 2/8, and 1/8, respectively.

Furthermore, a common list for the left screen 20a and the right screen 20b may also be set in such a manner that a predetermined display type appears more frequently than other display types.

Thereby, in a case where the display unit 3 executes display on the divisional screen 21, it is possible to display an image with a predetermined display type with a high frequency in the divisional screen 21 and it is possible to further improve convenience of a user when a display type of an image that is displayed on the divisional screen 21 is changed.

Furthermore, in a case where the display unit 3 executes display on the divisional screen 21, the navigation system 1 according to a variation sets a display type while putting priority on a change instruction for the screen 20a or 20b with a change instruction being previously applied thereto, in a case where change instructions are nearly simultaneously applied to the respective screens 20a and 20b. For example, in a case where a change instruction for the left screen 20a is accepted after a change instruction for the right screen 20b is accepted and before a display type of an image on the right screen 20b is changed, the navigation system 1 according to a variation sets a display type while putting priority on a change instruction for the right screen 20b, and subsequently, sets a display type for the left screen 20a.

Then, in a case where a display type is set based on a change instruction for the left screen 20a, the navigation system 1 according to a variation sets a display type while skipping a display type that is set based on a change instruction for the right screen 20b. Accordingly, images with an identical display type are prevented from being displayed on the left screen 20a and the right screen 20b, so that it is possible to improve convenience of a user.

Furthermore, in a case where the display unit 3 executes display on the divisional screen 21, the navigation system 1 according to a variation may set a display type while putting priority on a change instruction for a preliminarily set predetermined screen in a case where change instructions are nearly simultaneously applied to the respective screens 20a and 20b. For example, the right screen 20b on a driver's seat side is assumed to be a predetermined screen. Thereby, images with an identical display type are prevented from being displayed on the left screen 20a and the right screen 20b, so that it is possible to improve convenience of a user.

Furthermore, in a case where the display unit 3 executes display on the divisional screen 21, the navigation system 1 according to a variation may provide different display types between the respective screens 20a and 20b for display types of images that are displayed next to images that are currently displayed on the respective screens 20a and 20b. For example, the navigation system 1 according to a variation changes an order of display types in a list that is set so as to correspond to each of the screens 20a and 20b. Thereby, images with an identical display type are prevented from being displayed on the left screen 20a and the right screen 20b, so that it is possible to improve convenience of a user.

Furthermore, the navigation system 1 according to a variation may include a plurality of display units 3. The display control device 4 may accept change instructions for screens 20 (a plurality of screens) of the plurality of display units 3 to prevent identical images from being displayed on the screens 20 of the plurality of display units 3.

Furthermore, the navigation system 1 may capture an image of a gesture of a user by a camera, other than a touch operation, and execute a variety of operations based on such a captured image.

A list (order) may include a type other than the display type as described above, and may include, for example, traffic information. Traffic information is, for example, traffic jam information or traffic accident information. In a case where traffic information is displayed on the display unit 3, traffic information on a road near a vehicle is displayed. Additionally, in a case where a destination is set by the AVN unit 2, for example, traffic information on a running route is displayed in an ascending order of a distance from a vehicle.

Additionally, the aforementioned variations may be combined and applied.

Furthermore, the display control device 4 includes a computer-readable recording medium where a program for realizing a process as described above is recorded therein. A CPU reads a program that is recorded in a recording medium so that it is possible to execute a process as described above. A computer-readable recording medium is a semiconductor memory such as a ROM as described above, a magnetic disk, a magneto-optical disk, or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
a processor programmed to:
receive a change instruction for changing a display type on each of a plurality of screens configured to display images with different display types;
limit and set the display type in such a manner that images with an identical display type are not displayed on the plurality of screens when the display type is changed based on the received change instruction;
change an image on a screen of the plurality of screens that accepts the change instruction to an image corresponding to the set display type; and
in response to receiving and applying a plurality of change instructions to the plurality of screens, which are input in a predetermined period of time prior to changing images on the plurality of screens based on the plurality of change instructions, prioritize the change instruction received for a preliminary set particular screen of the plurality of screens as compared to the change instructions for the remaining plurality of screens, and set the display type for each of the plurality of screens based on the priority of each of the plurality of change instructions.

2. The display control device according to claim 1, wherein the processor is programmed to set the display type while prioritizing a change instruction for a screen of the plurality of screens to which the change instruction was previously applied, in a case where the plurality of change instructions are applied to the plurality of screens.

3. The display control device according to claim 1, wherein the processor is programmed to set display types of images displayed on adjacent screens of the plurality of screens to be different among the plurality of screens.

4. The display control device according to claim 1, wherein the processor is programmed to set the display type based on a pre-defined order for each of the plurality of images.

5. The display control device according to claim 1, wherein the processor is programmed to set the display type based on a pre-defined order in such a manner that a predetermined display type appears more frequently than other display types.

6. The display control device according to claim 1, wherein the processor is programmed to:
switch to a divisional screen for displaying the images with different display types or an integrative screen for displaying images with an identical display type, and
receive, for the integrative screen, operation instructions with more display types than display types of operation instructions for the divisional screen.

7. A display system comprising:
the display control device according to claim 1, and
a display configured to display the images with different display types.

8. A display control method comprising:
receiving a change instruction for changing a display type on each of a plurality of screens configured to display images with different display types;
limiting and setting the display type in such a manner that images with an identical display type are not displayed on the plurality of screens when the display type is changed based on the received change instruction;
changing an image on a screen of the plurality of screens that accepts the change instruction to an image corresponding to the set display type; and
in response to receiving and applying a plurality of change instructions to the plurality of screens, which are input in a predetermined period of time prior to changing images on the plurality of screens based on the plurality of change instructions, prioritizing the change instruction received for a preliminary set particular screen of the plurality of screens as compared to the change instructions for the remaining plurality of screens, and setting the display type for each of the plurality of screens based on the priority of each of the plurality of change instructions.

9. A non-transitory computer-readable recording medium storing a computer executable program that executes steps of:
receiving a change instruction for changing a display type on each of a plurality of screens configured to display images with different display types;
limiting and setting the display type in such a manner that images with an identical display type are not displayed on the plurality of screens when the display type is changed based on the received change instruction;
changing an image on a screen of the plurality of screens that accepts the change instruction to an image corresponding to the set display type; and
in response to receiving and applying a plurality of change instructions to the plurality of screens, which are input in a predetermined period of time prior to changing images on the plurality of screens based on the plurality of change instructions, prioritizing the change instruction received for a preliminary set particular screen of the plurality of screens as compared to the change instructions for the remaining plurality of screens, and setting the display type for each of the plurality of screens based on the priority of each of the plurality of change instructions.

10. The display control device according to claim 1, wherein the preliminary set particular screen of the plurality of screens is a screen on a seat side of a driver of a vehicle among two screens of the plurality of screens that are arranged on right and left sides.

11. The display control method according to claim 8, wherein the preliminary set particular screen of the plurality of screens is a screen on a seat side of a driver of a vehicle among two screens of the plurality of screens that are arranged on right and left sides.

12. The non-transitory computer-readable recording medium according to claim 9, wherein the preliminary set particular screen of the plurality of screens is a screen on a seat side of a driver of a vehicle among two screens of the plurality of screens that are arranged on right and left sides.

* * * * *